June 23, 1953

J. S. KAHN 2,643,038

UNIVERSAL NEEDLE THREADER

Filed Dec. 12, 1949

3 Sheets-Sheet 1

INVENTOR.
Julian Seth Kahn
BY
Percy Freeman
ATTORNEY.

June 23, 1953 J. S. KAHN 2,643,038

UNIVERSAL NEEDLE THREADER

Filed Dec. 12, 1949 3 Sheets-Sheet 2

INVENTOR.

Julian Seth Kahn

BY [signature]

ATTORNEY.

UNIVERSAL NEEDLE THREADER

Filed Dec. 12, 1949 3 Sheets-Sheet 3

INVENTOR.
Julian Seth Kahn
BY
ATTORNEY.

Patented June 23, 1953

2,643,038

UNITED STATES PATENT OFFICE 2,643,038

UNIVERSAL NEEDLE THREADER

Julian Seth Kahn, New York, N. Y.

Application December 12, 1949, Serial No. 132,451

14 Claims. (Cl. 223—99)

This invention relates to a needle threader for threading sewing machine needles, hand-sewing needles, lacing needles, and the like.

The principal object of this invention is the provision of a comprehensive type of needle threader which is adapted to thread virtually every kind of sewing needle, including needles used on sewing machines, hand-sewing needles, lacing needles, and the like. Many needle threaders of the prior art are adapted for use in connection with certain types of sewing needles, but not other types. For example, some needle threaders are useful for threading hand-sewing needles, but not for threading machine needles, and others may be used to thread sewing machine needles, but not hand-sewing needles. The present device may be used to thread virtually every type of sewing needle, used either industrially or in the home.

Another principal object of this invention is the provision of a needle threader for threading sewing machine needles, said needle threader being provided with means for automatically finding the needle eye. Satisfactory sewing machine needle threaders have not heretofore been devised. Those that are in use require that the operator himself locate the eye of the needle, and although it is easier to find the eye with the needle threader than with the thread itself, still the difficulty remains, especially in cases where the operator's eyesight is impaired and his hand is not quite steady.

Conventional sewing machine needles are provided with longitudinal grooves which communicate with the needle's eye. The present needle threader takes advantage of this longitudinal groove for the purpose of finding the needle's eye, though, as will be understood, the groove is not essential to the successful operation of my needle threader. The needle threader of the present invention is provided with a spring-urged thread-engaging barb which enters the longitudinal groove of the needle without any difficulty whatsoever. It then follows the groove directly toward the eye of the needle and the spring tension which actuates it causes it to spring or snap through the eye automatically. This may cause an audible click which would apprise even a blind operator that the barb has entered the eye and is ready to receive the thread. The thread may then be placed upon the barb and the barb retracted through the hole of the needle and the threading operation is completed.

A further object of this invention is the provision of a needle threader of the character described which is provided with a through needle hole into which the needle may be inserted to properly position the needle threader relative to the needle. Once this is done, the rest is a relatively simple matter, since a spring-urged barb is provided, as has above been indicated, to ride against the needle directly into the needle's eye.

Still another object of this invention is the provision of a sewing machine needle threader of the character described which is made of only few simple molded parts, a wire or stamped barb member, and a tension member which engages said barb member and urges it into engagement with the needle, and more particularly, the needle eye.

A still further object of this invention is the provision of a needle threader of the character described which is provided with a spring-urged or otherwise yieldingly urged thread-engaging barb and a holder for said barb, said holder being so devised that when it is grasped by the person intending to use the device, the barb is automatically retracted to inoperative position against the action of the yielding means. More specifically, the holder comprises two relatively movable parts, which are provided with cooperating cam faces. It is these cam faces which the fingers of the operator engage when the needle threader is grasped for use. The very act of engagement of the fingers with said cam faces while exerting very light pressure is sufficient to move the two parts of the holder apart and to cause retraction of the barb.

The problems involved in threading a machine needle and in threading a hand-sewing needle are quite different. A hand needle has the point at one end and its eye on the other end. It is a free needle and must be held in one hand while being threaded, the thread being held in the other hand. When a threader is used, it is held in one hand and the hand needle is deposited in a needle well or hole in the threader, thus to be supported and held while the other hand manipulates the thread.

With machine needles, the eye and the point are both on the same end and the needle itself is anchored and securely held in the sewing machine while being threaded. Thus it is not necessary to manually support the machine needle, and a threader may be manipulated by unencumbered hands. Besides, the eye of a machine needle is in a fixed position relative to the operator.

In previous attempts to make needle threaders for machine needles, a groove was provided in one end of a threader, the groove being more or less complementary to the needle surface and the threader was pushed against the side of the needle in order to push the barb or hook of one kind or another through the eye of the needle. Nothing could support the needle threader but the hand of the operator. Should the hand waver or shake, the barb, which necessarily was a very thin material, would be bent or deformed out of shape and frequently broken. Hence, it is an object of the present invention to provide a needle threader which is suitable for threading both machine needles and hand needles, and which, when used on machine needles, completely encompasses or surrounds the needle to effectively find the needle eye and as effectively thread the needle.

A preferred form of this invention is shown in the accompanying drawings, in which.

Figures 8, 8A, 9:
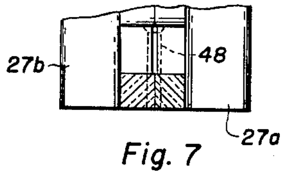
Fig. 8 is a view similar to that of Fig. 6, but showing the barb projecting through the eye of the needle.

Fig. 8*a* is a fragmentary and partially diagrammatic view, showing a machine needle in section, with a barb projecting through the eye.

Figure 6:
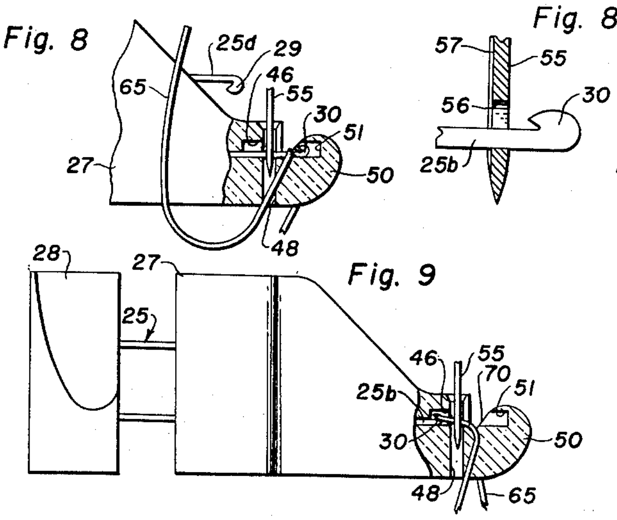
Fig. 6 shows said device mounted on a sewing machine needle, the barb being shown in partly retracted position and riding along the needle, the front end of the needle threader being partly broken away and in section to show the relationship of the barb to the needle.
Figure 5:
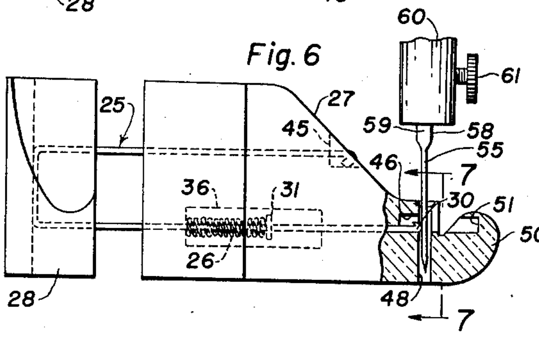
Fig. 5 is a view of a barb member, including the spring which is mounted thereon.
Figure 7:
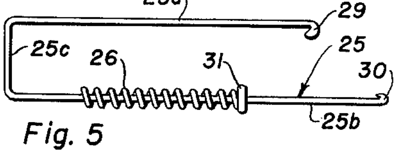
Fig. 7 is a sectional view on the line 7—7 of Fig. 6.

Fig. 9 is another view similar to that of Fig. 6, showing the barb once again in retracted position, after having drawn the thread through the eye of the needle.

Figure 10:
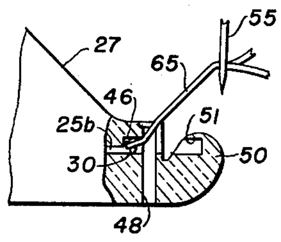

Fig. 10 is another view similar to Fig. 6, showing the threader withdrawn from the needle and pulling the bight of thread through the needle eye preparatory to releasing the thread.

Figure 1:
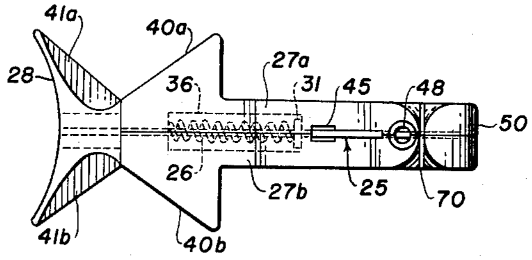
Fig. 1 is a top view of the machine-needle threading portion of the needle threader herein claimed.
Figure 3:
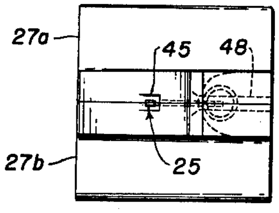
Fig. 3 is a front end view thereof.
Figures 2, 4:
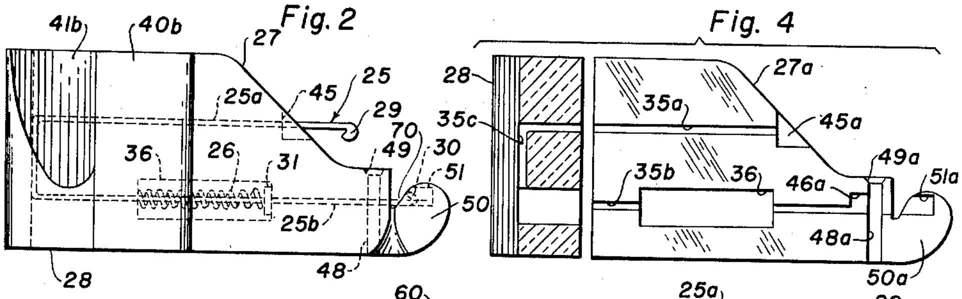
Fig. 2 is a side view thereof.
Fig. 4 is an exploded view of two of the three molded parts of said device, one of the parts being shown in section.
Figure 11:
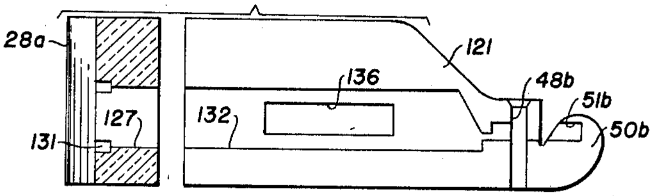

Fig. 11 is an exploded view similar to Fig. 4, but showing a modification.

Figures 12, 13, 14, 15, 16, 17:
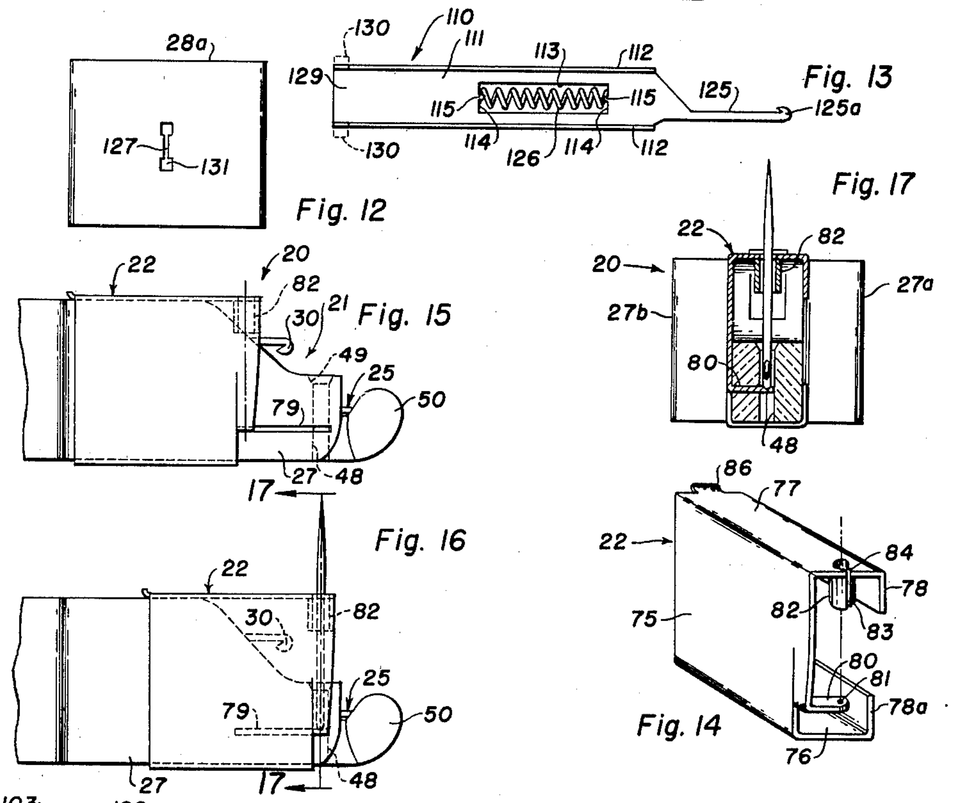

Fig. 12 is a rear end view thereof.

Fig. 13 is a view of a modified form of dart member and slide for use in the modification shown in Fig. 11.

Fig. 14 is a perspective view of the outer casing of the threading member shown in Figs. 15, 16, and 17, said casing including a hand-needle-engaging seat which coacts with the threading facilities of said needle threading member for hand-sewing-needle threading purposes.

Fig. 15 is an elevational view showing the casing mounted on the threading member, the hand-needle-engaging seat being held in inoperative position relative to the needle threading means.

Fig. 16 is a similar view showing the hand-needle-engaging seat in operative position relative to the needle threading means.

Fig. 17 is a sectional view taken on line 17—17 of Fig. 16.

Figures 18, 19:
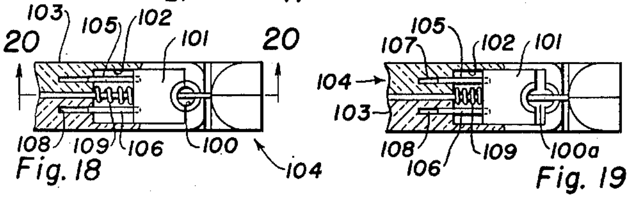

Fig. 18 is a fragmentary top view, partly in section, of the needle threader with an added feature of adjustable jaw means for engaging needles of larger diameter than the conventional type.

Fig. 19 is a fragmentary top view thereof showing the adjustable needle-engaging means in partly retracted position to accommodate a needle of relatively large diameter.

Figure 20:
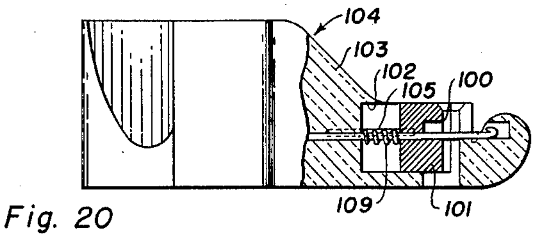

Fig. 20 is a side view thereof, partly broken away and in vertical section, taken on line 20—20 of Fig. 18.

Figure 21:
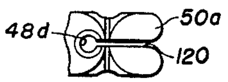

Fig. 21 is a fragmentary plan view showing a modification.

Figure 22:
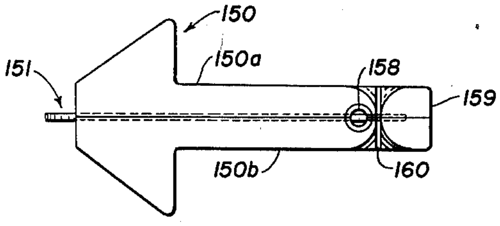

Fig. 22 is a plan view of a modified form of threader for machine needles, wherein no spring is used.

Figure 23:
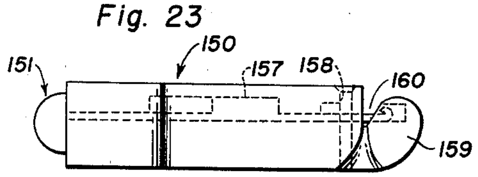

Fig. 23 is an elevational view thereof.

Figure 24:
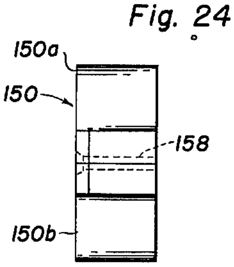

Fig. 24 is an end view thereof.

Figure 25:
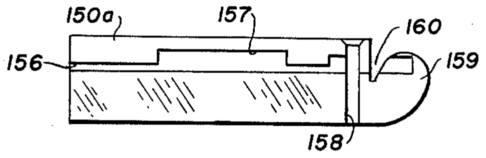

Fig. 25 is an elevational view of one-half the body member shown in Figs. 22, 23, and 24, before assembly.

Figure 26:
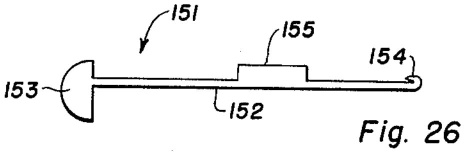

Fig. 26 is an elevational view of the barb threading member used in this modification.

Figure 27:
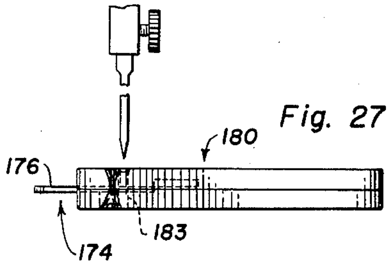

Fig. 27 is a side elevation of still a further modification of a threader for machine needles.

Figure 28:
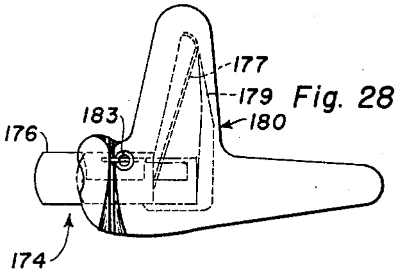

Fig. 28 is a plan view thereof.

Figure 29:
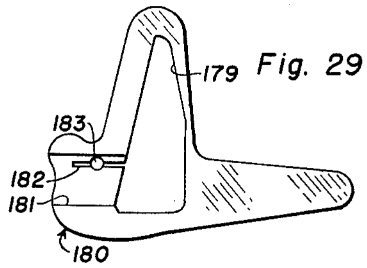

Fig. 29 is a plan view of one-half the body member shown in Fig. 28, before assembly.

Figure 30:
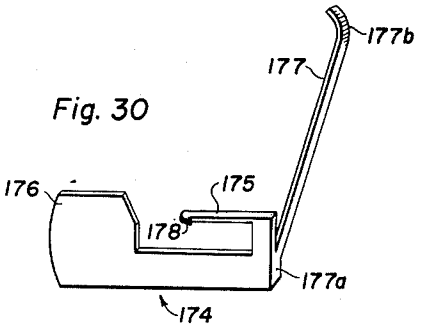

Fig. 30 is a perspective view of the barb threading member used in the modification shown in Fig. 28.

Needle threader 20 shown in Figs. 14–17, comprises a threading member body 21 and a casing or housing 22. Casing 22, as will shortly become apparent, includes means for cooperating with the needle threader body for threading hand-sewing needles.

Needle threader body 21 comprises the following principal elements: a needle-engaging barb member 25, a spring 26 which maintains the barb member under tension and tends to urge it into needle-engaging position, a body 27 in which said barb member is slidably mounted and which accommodates the spring 26, and a finger piece 28 in which the back end of the barb member is embedded. Actually, the body 27 comprises a pair of molded members **27*a* and 27*b*, respectively, which are cemented or otherwise affixed to each other. The finger piece 28 comprises a solid molded member. The barb member 25 may be a U-shaped member having a pair of legs 25*a* and 25*b*, respectively, and a yoke 25*c* which joins said legs at their respective back ends. A barb or hook 29 is formed at the forward end of leg 25*a* and a smaller barb or hook 30 is formed at the forward end of leg 25*b*. It will be noted that these two barbs or hooks are turned inwardly and toward each other. Slidably mounted on leg 25*b* is compression coil spring 26, and a stop 31 is provided on said leg to prevent the spring from moving forwardly beyond a pre-determined point. This stop may comprise a flattened or swaged portion on leg 25*b***, intermediate its ends.

A groove **35*a* is formed in body block 27*a* to accommodate the greater part of leg 25*a* of the barb member and a second groove 35*b* is also formed in said body block to accommodate the greater part of leg 25*b*. A U-shaped groove 35*c* is formed in finger piece molding 28 to accommodate the yoke and the adjoining portions of legs 25*a* and 25*b*, the lower leg of said groove being large enough to permit the passage therethrough of stop 31 and spring 26 when the U-shaped barb member 25 is entered into and extended through said groove 35*c* in the finger piece. Groove 35*b*** is enlarged intermediate its ends to form a recess 36 to accommodate spring 25 and swaged portion 31. It will be understood that molded block 27b is also provided with grooves corresponding to grooves 35a, and 35b, and with a recess corresponding to recess 36. Hence, when members 27a and 27b are fastened together to form body 27, said body is adapted to house the barb member 25, including its swaged portion 31 and spring 26. There is a sliding fit between the legs of the barb member 25 on the one hand and grooves 35a and 35b on the other hand, so that relative movement between the barb member and body 27 may take place. This may be seen in Figs. 6, 8, and 9. The yoke portion of barb member 25 and the adjoining portions of the leg members are firmly fixed, however, in finger piece 28. Hence, when the finger piece is moved relative to body 27, relative movement between the barb member 25 and body 27 takes place. When the finger piece and body 27 are pulled apart, barb member 25 is brought into retracted position against the action of spring 26. When finger piece 28 is released, spring 26 will act upon the barb member to move it forwardly to operative position and by the same token the finger piece will be moved toward and into abutment with body 27.

To facilitate retraction of the barb member, body 27 is provided with cam faces 40a and 40b, respectively, and the finger piece 28 is provided with cooperating cam faces 41a and 41b, respectively. Cam faces 40a and 41a meet at the line of abutment between body 27 and finger piece 28, and they bear at an angle with respect to each other. The same is true of cam faces 40b and 41b, respectively. Hence, when the person using this device grasps it, and more particularly its cam faces, between thumb and forefinger, the slightest squeezing pressure upon said cam faces will tend to cause finger piece 28 to move backwardly and away from body 27. When the cam faces are released, finger piece 28 will spring back into abutment with body 27 in response to the action of spring 26 upon the barb member 25 to which said finger piece is connected.

It will be seen in Fig. 4 that a recess 45a is formed in housing block 27a at the approach to groove 35a and a second recess 46a is formed at the approach to groove 35b. Corresponding recesses are formed in body block 27b and when the two blocks are fastened together said recesses are in registration with each other to form recesses 45 and 46, respectively, shown in Figs. 6, 8, and 9. These recesses 45 and 46 are large enough to accommodate barbs 29 and 30, respectively, as Fig. 6 clearly shows. At the forward end of body block 27a is a vertically extending groove 48a having a flattened or countersunk upper end portion 49a. This groove 48a with its countersunk approach finds its counterpart in body block 27b and when the two blocks are fastened together, a vertical hole 48 is thereby formed having a countersunk opening 49. This hole 48 communicates with the grooves in which leg 25b of barb member 25 is slidably disposed and it also communicates with recess 46. Hole 48 has no wall directly opposite said grooves and said recess. Hence, when the barb member 25 is moved forwardly to its projected operative position in response to the action of spring 26 thereon, its hook or barb 30 will pass diametrically through and across hole 48 into the space 51 beyond said hole. As a matter of fact, the forward end 50a of body member 27a is provided with a recess 51a directly opposite groove 35b and recess 46a. A similar recess is found in body block 27b and when the two body members 27a and 27b are brought together, their respective forward ends 50a form forward end portion 50 of the body, and their respective recesses 51a enter into registration with each other to form recess 51. Recess 51 receives barb 30 when the barb member 25 is in its forwardmost position. (See Figs. 2 and 8.)

Hole 48 is adapted to receive sewing machine needle 55 and its countersunk approach 49 facilitates entry of said needle into said hole. Sewing machine needle 55 is a conventional needle and it has an eye 56 formed therein as well as a longitudinal groove 57 which extends upwardly from said eye 56 to accommodate the thread. Groove 57 is formed on the side of the needle opposite flat portion 58 thereof on shank 59. This shank projects up into sewing machine chuck 60, and its flat side 58 is engaged by a thumb screw 61. All that need be done to locate the needle eye is to slide the needle threader up on the needle, and hold it parallel to the front of the body of the operator, and above the needle eye, then with the barb projected to ride against the needle, slide the threader downwardly till the barb snaps into the eye. This is done when the finger piece is in retracted position, as witness Fig. 6, and said finger piece is then released. Spring-urged barb 30 will then move into engagement with the needle and more particularly its groove 57. If said barb doesn't immediately find the groove, the needle threader may be swung gently from side to side until the groove is found. The spring tension will hold the needle threader in elevated position relative to the eye of the needle, and downward pressure on the threader is required to bring the barb into registration with said eye. When registration is effected, as stated above, the barb will automatically pass through the eye of the needle and into recess 51. (See Fig. 8.) Thread 65 may now be looped upon leg 25b of the barb member and said barb member may then be retracted to its position shown in Fig. 9. The thread has now been brought through the eye of the needle and the needle threader may then be slid downwardly and removed from said needle, and the barb member once again released. (See Fig. 10.)

The operations aforementioned may be facilitated by molding the several molded parts as follows: The forward end of body 27 may be tapered upwardly to relatively narrow proportions in the neck area 70 between the main portion of said body 27 and its forward end portion 50. This will facilitate looping the thread about the barb member 25 as clearly appears from Fig. 8.

Barb 29 may be utilized for threading a hand-sewing needle or any other needle to which the device as above described would not be suited.

Threading member body 21 is slidably mounted in a casing 22 which is shaped to conform to the shape of the body member. The casing comprises a side wall 75 covering one side of the body member, bottom wall 76, top wall 77 and two inturned flanges 78 and 78a, which lap over the opposite side of the threader body 22. The bottom 76 and its flange 78 are somewhat shorter than top wall 77 and its flange 78a, and from the lower part of side wall 75 there is formed an inwardly extending shelf 80 which is provided with a dimple 81 to serve as a needle seat for the butt ends of hand-sewing needles. This shelf is spaced from and parallel to bottom wall 76. Its location is such as to bring the eye of a hand needle in line with the bill of the threading barb 25b when the butt end of said needle rests on the dimpled seat 81. There is a slot 79 in body member 27 that accommodates the shelf 80 which slides in said slot. The arrangement is such as to enable the threading member 21 to slide forwardly relative to its casing to its position shown in Fig. 15 or backwardly to its Fig. 16 position. When the threader body is in its forward position (Fig. 15), it may be utilized for threading a sewing machine needle in the manner above described. When it is retracted to its Fig. 16 position, it may be utilized to thread a hand-sewing needle. A finger piece 86 at the back end of casing 22 facilitates moving said casing member and the threader body relative to each other.

Affixed to the underside of top wall 77 of casing 22 is a tubular member 82 having a slit 83 formed vertically thereof on its wall side. This slit 83 continues upwardly into the top wall 77 in the form of a slit 84 in said top wall. It will be noted in Fig. 14 that the dimple 81 and said tubular member 82 are in vertical, axial alignment. When the threading member body 21 is in its fully retracted position (Fig. 16) its hole 48 will be in alignment with tubular member 82 and with needle seat dimple 81. Hence, when a needle is inserted butt end downwardly, through tubular member 82, it will project through hole 48 and thence into seat 81 of shelf member 80. The needle may then be threaded in the manner previously described and slits 83 and 84 will serve as passageways for the thread.

Hole 48 is of fixed dimensions and it may be found desirable to provide means to adjust the size of the hole to accommodate needles of greater thicknesses than those commonly used. Needle hole 100 shown in Fig. 18 is just such adjustable hole as witness the same hole 100a in its expanded condition in Fig. 19. This hole is made adjustable by providing a movable or slidable jaw member 101 which constitutes the rear wall of the hole. This slide is mounted in a recess 102 formed in the body 103 of the needle threader 104 shown in Figs. 18, 19, and 20. A pair of pins 105 and 106 are fastened to slide 101, and they ride in holes 107 and 108, respectively. A compression spring 109 bears against the main body of the threading member and also against said slide and urges said slide to move forwardly into its Fig. 18 position. Pins 105 and 106 ride in holes 107 and 108 and thereby prevent dislodgement of said slide 101.

In the modification shown in Figs. 11, 12 and 13, a stamping 110 may be utilized to take the place of wire barb member 25. The stamping may be of thin sheet metal of channel crosssection with web 111 and flanges 112. The web is extended beyond the flanges to provide barb member 125 having a hook 125a formed at its free end. A recess 113 is provided for the accommodation of coil spring 126. In order to facilitate assembly of the barb member, the spring and the body parts, means are provided to retain the spring in recess 113. To that end, there are extended from the end walls 114 of the recess, inreaching lugs 115 which extend into the coil spring 126 at each end thereof, as clearly shown in Fig. 13. The finger piece 28a in this case is provided with through opening 127 shaped to accommodate the rear end 129 of channel 110 which extends through said opening. Bendable lugs 130 extending from flanges 112 are received in shouldered recesses 131 of the finger piece. The body member 121 is provided with recess 132 to slidingly receive member 110.

In Figs. 22 to 26, there is shown an extremely simple needle threader for machine needles wherein no spring is required. Body member 150 comprises two halves 150a and 150b which may be secured together in any convenient manner to slidingly hold threading barb member 151. The barb member 151 may be a sheet metal stamping having a stem 152, a handle 153, a hooked end 154 and a stop 155. At least one-half of body member 150, as for instance, half 150a, is provided with recess 156 to accommodate threading member 151, the enlarged portion 157 of the recess being long enough so stop member 155 may abut the ends of the recess portion 157 to limit sliding movement of the threading member 151 in both directions. The threader is otherwise provided with needle hole 158, nose 159, and throat 160 similar to those previously described with respect to the preferred forms. In using the modification just described, it is merely necessary to grasp handle 153 and to withdraw the barb member 151 to clear the needle hole 158. Then slide the body member onto the needle and then by gentle pressure on the handle member, slide the body down on the needle until the barb finds its way into and through the needle eye. Then after looping the thread over the stem 152, the handle is grasped to withdraw the barb from the needle, drawing the thread with it.

In the modification shown in Figs. 27 to 30, the threading barb member and spring are formed of one integral stamping and partakes of some of the advantages of the needle threader disclosed in my co-pending application, Serial No. 107,022, filed July 27, 1949.

The threading barb member comprises a threading barb 175, a finger piece or plunger 176, and a spring 177. The threading barb 175 is bent at right angles from the plane of the plunger or finger piece 176, and has a hook 178. Also bent substantially at right angles to the plane of the plunger 176 is spring root plate 177a which continues upwardly as the spring 177. Spring 177 projects upwardly at an angle from the vertical and it may be bent at its upper end portion to form a curved portion 177b. The stamping 174 thus described and best shown in Fig. 30 is mounted in casing shown in Figs. 28 and 29, the spring portion 177 being disposed in the spring chamber 179. The body 180 is provided with a recess 181 communicating with spring chamber 179, and slidably accommodates the stamping 174, a further groove 182 being provided for the accommodation of the barb 175. The body is further provided with a needle hole 183 which extends through and through the body.

In using this modification, it is merely necessary to press the plunger 176 inwardly so that the barb 175 clears the needle hole 183, then to slide the body member on to the anchored needle. The plunger 176 may then be released and the threader body slid downwardly on the needle until the barb snaps into place through the eye of the needle under the influence of the spring 177. Then after the thread is looped over barb 175, the plunger 176 may again be depressed to withdraw the barb from the eye of the needle, drawing the thread with it.

In Fig. 21, the nose 50a of any of the modifications is shown as having a slit 120 extending from needle hole 48d to the outer surface of the nose 50a to facilitate passage of the thread under certain conditions.

The foregoing is descriptive of preferred forms of this invention, and it will be understood that these forms may be modified in numerous ways within the broad scope and spirit of this invention.

Having thus described my invention, what I claim as new and desire to secure by Letters Patent, is:

1. A needle threader of the character described, comprising a body member having a vertical, needle-receiving hole the diameter of which throughout is at least as great as the diameter of a needle which is to be threaded, formed to extend through and through said body member, a needle-engaging barb member slidably mounted in said body member for horizontal movement diametrically across said hole and having one end extending out of and beyond the body member, and a finger-piece connected to said extending end of said barb member for withdrawing the barb member from across said hole.

2. A needle threader of the character described, comprising a body member having a vertical, needle-receiving hole formed therethrough, a needle-engaging barb member slidably mounted in said body member for horizontal movement across said hole, and having one end extending out of and beyond the body member, a spring within said body member yieldingly projecting said barb member across said hole, and a finger-piece connected to said extending end of said barb member for withdrawing the barb member from the hole against the spring action and normally abutting said body, said finger-piece and said body member having cooperating cam faces which incline toward the longitudinal medial line of the needle-engaging barb member and meet at the line of abutment between said body member and said finger piece and may be held between a user's fingers to cam the finger-piece away from the body member, and thereby to withdraw the barb member from the hole against the spring action.

3. A needle threader in accordance with claim 2, wherein the needle-engaging barb member is a U-shaped element having a yoke and two legs, one leg of which crosses the needle-receiving hole and a hook at the free end of said latter leg, said yoke and the adjoining portions of the legs being fixed in the finger-piece for integral movement therewith.

4. A needle threader of the character described, comprising a body member, a sleeve slidably mounted on said body member said body member having a vertical, needle-receiving hole therethrough, a needle-engaging barb member slidably mounted in said body member for horizontal movement across the axis of said hole, a spring within said body member for yieldingly projecting said barb member across said hole, and a finger-piece connected to said barb member for retracting the barb member from across the hole against the spring action, said sleeve being provided with a needle seat which may be brought into axial registration with the needle-receiving hole in the body member by sliding said sleeve relative to said body member.

5. A universal needle threader suitable for threading selectively sewing machine needles, and hand-sewing needles, said threader including a body member having a vertical hole therethrough for machine needles, a sleeve through which said body member slides, a needle seat carried by the sleeve to be interposed across and to close off part of said vertical hole and to receive and support the butt ends of hand-sewing needles when said housing sleeve is moved to such position, a needle-engaging barb member which is slidably mounted in said body member for horizontal movement across the axis of said hole, and which has one end extending out of said body member, said barb member being provided with a finger piece secured to its extending end for withdrawing the barb member from across said hole.

6. A universal needle threader suitable for threading selectively sewing machine needles, and hand-sewing needles, said threader including a body member having a vertical hole therethrough for machine needles, a sleeve through which said body member slides, a needle seat carried by the sleeve to be interposed across and to close off part of said vertical hole and to receive and support the butt ends of hand-sewing needles when said sleeve is moved to such position, carrying and presenting an additional needle guide carried by the sleeve to be presented axially over said hole for greater accuracy in supporting the hand-sewing needle, and a needle-engaging barb member which is slidably mounted in said body member for horizontal movement across the axis of said hole, and which has one end extending out of said body member, said barb member being provided with a finger-piece secured to its extending end for withdrawing the barb member from across said hole.

7. A universal needle threader suitable for threading selectively sewing machine needles, and hand-sewing needles, said threader including a body member having a vertical hole therethrough for machine needles, a sleeve through which said body member slides, a needle seat carried by the sleeve to be interposed across and to close off part of said vertical hole and to receive and support the butt ends of hand-sewing needles when said sleeve is moved to such position, a needle-engaging barb member which is slidably mounted in said body member for horizontal movement across the axis of said hole, and which has one end extending out of and beyond the body member, said extending end being provided with a finger piece for withdrawing the barb member from across said hole, said finger piece normally abutting the body member, cooperating cam surfaces on the finger piece and the body member which cam surfaces incline toward the longitudinal medial line of the needle-engaging barb member and meet at the line of abutment between said body member and said finger piece for receiving the fingers of an operator so the barb will be retracted in the act of squeezing the finger piece between the thumb and forefinger.

8. A universal needle threader suitable for threading selectively sewing machine needles, and hand-sewing needles, said threader including a body member having a vertical hole therethrough for machine needles, a sleeve through which said body member slides, a needle seat carried by the sleeve to be interposed across and to close off part of said vertical hole and to receive and support the butt ends of hand-sewing needles when said sleeve is moved to such position, a needle-engaging barb member which is slidably mounted in said body member for horizontal movement across the axis of said hole and which has one end extending out of said body member, a spring within said body member yieldingly projecting said barb member across said hole, said barb member being provided with a finger piece secured to its extending end for withdrawing the barb member from across said hole, said threader being constructed and arranged to slide upwardly over a machine needle completely embracing the needle, the spring being of such tension as to cause the threader, when the finger piece is released, to ride yieldingly along the needle so the barb may snap into place when it registers with the needle eye.

9. A universal needle threader suitable for threading selectively sewing machine needles, and hand-sewing needles, said threader including a body member having a vertical hole therethrough for machine needles, a sleeve through which said body member slides, a needle seat carried by the sleeve to be interposed across and to close off part of said vertical hole and to receive and support the butt ends of hand-sewing needles when said sleeve is moved to such position, an additional needle guide carried by the sleeve to be presented axially over said hole for greater accuracy in supporting the hand-sewing needle, a needle-engaging barb member which is slidably mounted in said body member for horizontal movement across the axis of said hole and which has one end extending out of said body member, said barb member being provided with a finger piece secured to its extending end for withdrawing the barb member from across said hole, said threader being constructed and arranged to slide upwardly over a machine needle completely embracing the needle, a spring within said body member yieldingly projecting said barb member across said hole, the spring being of such tension as to cause the threader, when the finger piece is released, to ride yieldingly along the needle so the barb may snap into place when the barb registers with the needle eye.

10. A universal needle threader suitable for threading selectively sewing machine needles, and hand-sewing needles, said threader including a body member having a vertical hole therethrough for machine needles, a sleeve through which said body member slides, a needle seat carried by the sleeve to be interposed across and to close off part of said vertical hole and to receive and support the butt ends of hand-sewing needles when said sleeve is moved to such position, a needle-engaging barb member which is slidably mounted in said body member for horizontal movement across the axis of said hole, and which has one end extending out of and beyond the body member, said extending end being provided with a finger piece for withdrawing the barb member from across said hole, said finger piece normally abutting the body member, cooperating cam surfaces on the finger piece and the body member which cam surfaces incline toward the longitudinal medial line of the needle-engaging barb member and meet at the line of abutment between said body member and said finger piece for receiving the fingers of an operator so the barb will be retracted in the act of squeezing the finger piece between the thumb and forefinger, said threader being constructed and arranged to slide upwardly over a machine needle completely embracing the needle, a spring within said body member yieldingly projecting said barb member across said hole, the spring being of such tension as to cause the threader, when the finger piece is released, to ride yieldingly along the needle so the barb may snap into place when the barb registers with the needle eye.

11. A needle threader of the character described, comprising a body member having a vertical, needle-receiving hole formed therethrough, a needle-engaging barb member slidably mounted in said body member for horizontal movement across said hole, means to yieldingly project the barb, and a finger-piece connected to said barb member for withdrawing the barb member from the hole against the action of said yielding means, said finger-piece and said body member having cooperating cam faces which incline toward the longitudinal medial line of the needle-engaging barb member and meet at the line of abutment between said body member and said finger piece, and which may be held between a user's fingers to cam the finger-piece away from the body member, and thereby to withdraw the barb member from the hole.

12. A needle threader of the character described, comprising a sleeve, a body member slidably mounted in said sleeve and having a vertical, needle-receiving hole therethrough, a needle-engaging barb member slidably mounted in said body member for horizontal movement across the axis of said hole, means to yieldingly project the barb, and a finger-piece connected to said barb member for retracting the barb member from across the hole against the action of said yielding means.

13. A needle threader in accordance with claim 12, wherein the sleeve is provided with a needle seat which may be brought into axial registration with the needle-receiving hole in the body member by sliding said body member relative to said sleeve.

14. A needle threader of the character described, comprising a needle-receiving member having a needle-receiving hole formed to extend through and through said member, the diameter of said hole being throughout at least as great as the diameter of a needle which is to be threaded, a needle-engaging barb member slidably mounted relative to said needle-receiving member for movement diametrically across said hole, a spring within said member for yieldingly projecting said barb member across said hole, and, a finger-piece connected to said barb member for withdrawing the barb member from the hole against the spring action.

JULIAN SETH KAHN.

References Cited in the file of this patent

UNITED STATES PATENTS

| Number | Name | Date |
|---|---|---|
| 524,896 | Goldman | Aug. 21, 1894 |
| 2,006,185 | Sidler | June 25, 1935 |
| 2,311,665 | Kahn | Feb. 23, 1943 |

FOREIGN PATENTS

| Number | Country | Date |
|---|---|---|
| 5,462 | Sweden | Jan. 5, 1894 |
| 11,241 | Great Britain | 1885 |